United States Patent
Robertson et al.

(10) Patent No.: US 10,246,789 B2
(45) Date of Patent: *Apr. 2, 2019

(54) SYSTEMS AND METHODS FOR COPPER RECOVERY VIA ROASTING AND LEACHING

(71) Applicant: FREEPORT MINERALS CORPORATION, Phoenix, AZ (US)

(72) Inventors: Joanna M Robertson, Thatcher, AZ (US); Thomas R Bolles, Tucson, AZ (US); Wayne W Hazen, Lakewood, CO (US); Lawrence D May, Westminster, CO (US); Jay C Smith, Pearl River, LA (US); David R Baughman, Golden, CO (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/099,966

(22) Filed: Apr. 15, 2016

(65) Prior Publication Data

US 2016/0230296 A1    Aug. 11, 2016

Related U.S. Application Data

(63) Continuation of application No. 13/716,836, filed on Dec. 17, 2012, now Pat. No. 9,340,849.

(Continued)

(51) Int. Cl.
*C22B 1/26* (2006.01)
*C25C 1/12* (2006.01)

(Continued)

(52) U.S. Cl.
CPC ............... *C25C 1/12* (2013.01); *C22B 1/02* (2013.01); *C22B 1/26* (2013.01); *C22B 3/02* (2013.01);
(Continued)

(58) Field of Classification Search
CPC ........................................................ C25C 1/12
See application file for complete search history.

(56) References Cited

U.S. PATENT DOCUMENTS

| 1,346,175 A | 7/1920 | Caron |
| 1,440,186 A | 12/1922 | Sulman et al. |

(Continued)

FOREIGN PATENT DOCUMENTS

| CA | 2732486 | 9/2011 |
| GB | 2456701 | 7/2009 |

(Continued)

OTHER PUBLICATIONS

Non-Final Office Action from U.S. Appl. No. 13/716,836 dated Sep. 26, 2014.

(Continued)

*Primary Examiner* — Melissa S Swain
(74) *Attorney, Agent, or Firm* — Snell & Wilmer L.L.P.

(57) ABSTRACT

Various embodiments provide a process roasting a metal bearing material under oxidizing conditions to produce an oxidized metal bearing material, roasting the oxidized metal bearing material under reducing conditions to produce a roasted metal bearing material, and leaching the roasted metal bearing material in a basic medium to yield a pregnant leach solution.

19 Claims, 2 Drawing Sheets

Related U.S. Application Data

(60) Provisional application No. 61/577,995, filed on Dec. 20, 2011.

(51) Int. Cl.

| | | |
|---|---|---|
| *C22B 1/02* | (2006.01) | |
| *C22B 23/00* | (2006.01) | |
| *C25C 1/00* | (2006.01) | |
| *C22B 3/02* | (2006.01) | |
| *C22B 3/14* | (2006.01) | |
| *C22B 3/12* | (2006.01) | |
| *C25C 7/02* | (2006.01) | |
| *C22B 3/22* | (2006.01) | |
| *C22B 15/00* | (2006.01) | |
| *C22B 3/00* | (2006.01) | |
| *C25C 5/02* | (2006.01) | |

(52) U.S. Cl.
CPC .................. *C22B 3/12* (2013.01); *C22B 3/14* (2013.01); *C22B 3/22* (2013.01); *C22B 15/0002* (2013.01); *C22B 15/0078* (2013.01); *C22B 15/0086* (2013.01); *C22B 23/005* (2013.01); *C22B 23/0446* (2013.01); *C22B 23/0453* (2013.01); *C25C 1/00* (2013.01); *C25C 5/02* (2013.01); *C25C 7/02* (2013.01); *Y02P 10/234* (2015.11)

(56) References Cited

U.S. PATENT DOCUMENTS

| | | | |
|---|---|---|---|
| 1,509,774 A | * | 9/1924 | Perkins .............. C22B 15/0063 423/33 |
| 1,825,949 A | | 10/1931 | Haas |
| 2,290,313 A | | 7/1942 | Caron |
| 2,400,098 A | | 5/1946 | Brogdon |
| 2,400,114 A | | 5/1946 | Hills |
| 2,400,115 A | | 5/1946 | Hills et al. |
| 2,576,314 A | | 11/1951 | Forward |
| 2,693,404 A | | 11/1954 | Mackiw |
| 4,187,281 A | | 2/1980 | Stauter |
| 6,524,367 B1 | | 2/2003 | Castellanos Suarez et al. |
| 2007/0248514 A1 | | 10/2007 | Cheng et al. |
| 2009/0056502 A1 | | 3/2009 | Mendes et al. |
| 2011/0129397 A1 | | 6/2011 | Shiokawa et al. |

FOREIGN PATENT DOCUMENTS

| | | |
|---|---|---|
| IN | 187882 | 7/2002 |
| JP | 2011214132 | 10/2011 |
| WO | WO 2004035840 | 4/2004 |
| ZA | 200204434 | 4/2003 |

OTHER PUBLICATIONS

Final Office Action from U.S. Appl. No. 13/716,836 dated Jul. 10, 2015.

Notice of Allowance and Examiner's Amendment from U.S. Appl. No. 13/716,836 dated Jan. 20, 2016.

* cited by examiner

SYSTEMS AND METHODS FOR COPPER RECOVERY VIA ROASTING AND LEACHING

CROSS REFERENCE TO RELATED APPLICATIONS

This application is a continuation application of and claims priority to U.S. patent application Ser. No. 13/716,836, entitled "SYSTEMS AND METHODS FOR METAL RECOVERY" which was filed Dec. 17, 2012. The '836 application is a nonprovisional application of and claims priority to U.S. Provisional Application Ser. No. 61/577,995, entitled "SYSTEMS AND METHODS FOR METAL RECOVERY" which was filed on Dec. 20, 2011. The aforementioned applications are hereby incorporated by reference herein in their entirety.

FIELD OF INVENTION

The present disclosure relates, generally, to systems and methods for recovering metal values from metal bearing materials, and more specifically, to systems and methods for processing acid consuming ores.

BACKGROUND OF THE INVENTION

Hydrometallurgical treatment of metal bearing materials, such as copper ores, concentrates, and other metal bearing materials, has been well established for many years. Typically, conventional hydrometallurgical processes for copper recovery involve leaching metal bearing materials with an acidic solution, either atmospherically or under conditions of elevated temperature and pressure. The resultant process stream—the pregnant leach solution—is recovered, and a processing step such as solution extraction is used to form a highly concentrated and relatively pure metal value containing aqueous phase. One or more metal values may then be electrowon from this aqueous phase.

Certain ores consume a relatively high amount of acid during acidic leaching. Thus, highly acid consuming ores have conventionally been more expensive to process through acidic leaching. Highly acid consuming copper containing ores include copper carbonates, such as azurite and malachite, among other types of minerals.

Certain ores and/or flotation tailings contain a mix of oxides and sulfides of one or more metals associated with highly acid consuming gangue materials such as carbonates. These mixed materials may be problematic in acid leaching because of the highly acid consuming nature of the gangue minerals and because sulfide minerals leach more slowly and less completely than oxide minerals, causing low metal recovery and plant design complications.

Accordingly, processes that allow for metal recovery from highly acid consuming ores without the need for acid leaching would be advantageous.

SUMMARY OF THE INVENTION

Accordingly, the present invention provides systems and methods for metal value recovery. In various embodiments, a process is provided comprising roasting a metal bearing material under oxidizing conditions to produce an oxidized metal bearing material, roasting the oxidized metal bearing material under reducing conditions to produce a reduced metal bearing material, and leaching the roasted metal bearing material in a basic medium to yield a pregnant leach solution. In various embodiments, the pregnant leach solution is subjected to solution extraction.

Further, various embodiments of the present invention provide a process comprising one or more of oxidizing sulfides of copper and cobalt by roasting under an oxygen containing gas to produce an oxidized copper and cobalt bearing material, reducing copper and cobalt by roasting the oxidized copper bearing material under a reducing gas which may comprise hydrogen, carbon monoxide, another reducing gas such as those described herein, and/or mixtures thereof, to produce a roasted copper and cobalt bearing material, leaching the roasted copper and cobalt bearing material using free ammonia and an ammonium complex to yield a pregnant leach solution, recovering copper by solvent extraction and precipitating cobalt containing compounds from the solvent extraction raffinate solution, and electrowinning the copper.

Still in further exemplary embodiments, a system is provided comprising an oxidizing roaster configured to receive oxygen gas and configured to heat a metal bearing material to temperatures of from about 200° C. to about 800° C., a reducing roaster configured to receive at least one of carbon monoxide gas and hydrogen gas and configured to heat the metal bearing material to temperatures of from about 200° C. to about 800° C., a quench vessel configured to receive a roasted metal bearing material from the roaster, a basic leaching vessel or vessels in series configured to receive quenched metal bearing material from the quench vessel, one or more solvent extraction stages configured to receive a high pH solution containing copper and cobalt, one or more wash stages configured to receive loaded organic from the solvent extraction stage, one or more stripping stages configured to receive washed loaded organic from the wash stage, a copper electrowinning circuit configured to receive rich electrolyte solution from the stripping stage, and a cobalt precipitation vessel configured to receive raffinate from the solvent extraction stage.

Further areas of applicability will become apparent from the detailed description provided herein. It should be understood that the description and specific examples are intended for purposes of illustration only and are not intended to limit the scope of the present invention.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

Figure 1:
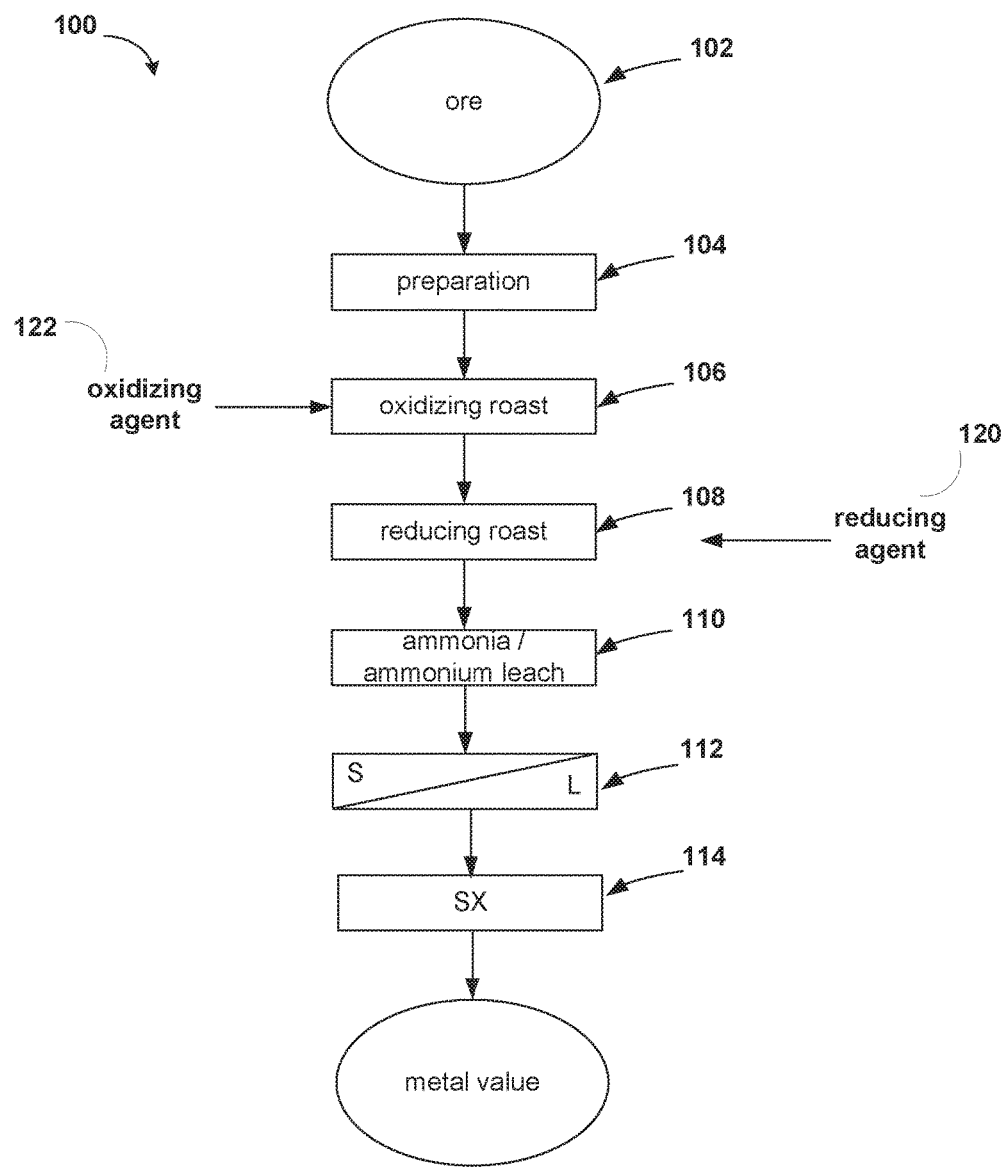
FIG. 1 is a flow diagram illustrating a process that does not include an acid leach, in accordance with various embodiments of the present invention.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized and that logical and mechanical changes may be made without departing from the spirit and scope of the present invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present invention relates, generally, to systems and methods for recovering metal values from metal-bearing materials, and more specifically, to systems and methods for metal recovery using basic leaching. These improved systems and methods disclosed herein achieve an advancement in the art by providing a metal value recovery system that tends to avoid the use of acid leach media with high acid consuming metal-bearing materials. Such technology tends to reduce the cost of metal recovery by, at least, reducing the amount of acid needed to leach a given ore body mass.

In particular, it has been discovered that one or more roasts may be combined with a basic leach to leach metal values from metal bearing materials such as ore. In that regard, in various embodiments, one or more roasts may be combined with a leach in basic media to yield a metal value containing material that is suitable for use in a conditioning process, such as solution extraction.

With reference to FIG. 1, metal recovery 100, in accordance with various embodiments, is illustrated. Metal recovery 100 allows for metal values to be recovered from a basic leach without an acid leach. Metal recovery 100 includes ore 102, which contains one or more metal values.

Ore 102 may comprise any metal bearing material, such as an ore, a combination of ores, a concentrate, a process residue, a flotation tailings product, an impure metal salt, combinations thereof, or any other material from which metal values may be recovered. Metal values such as, for example, copper, gold, silver, zinc, platinum group metals, nickel, cobalt, molybdenum, rhenium, uranium, rare earth metals, and the like may be recovered from ore 102 in accordance with various embodiments of the present invention. Various aspects and embodiments of the present invention, however, prove especially advantageous in connection with the recovery of copper from highly acid consuming ores that include copper carbonates, such as azurite and malachite, among other highly acid consuming ores and gangue minerals. Highly acid consuming ores may comprise any metal bearing material that requires a high ratio of acid to metal bearing material volume to leach a commercially significant proportion of the metal values in the metal bearing material. In various embodiments, ore 102 comprises at least copper and cobalt and/or compounds comprised of copper and/or cobalt.

Ore 102 may be prepared in preparation 104. Preparation 104 may include any form of preparation for ore 102 prior to roasting 106. In various embodiments, preparation 104 is omitted, although various advantages may be derived through the use of preparation 104. Metal bearing materials may be prepared in a variety of ways. Ores may be dried, crushed, pulverized, finely ground, or undergo any combination thereof. Ores may be concentrated to form a metal bearing concentrate. A variety of acceptable techniques and devices for reducing the particle size of the ore 102 are currently available, such as crushers, ball mills, tower mills, ultrafine grinding mills, attrition mills, stirred mills, horizontal mills and the like, and additional techniques may later be developed that may achieve the desired result of increasing the surface area of and exposing mineral surfaces within the material to be processed. In accordance with various embodiments, ore 102 may be prepared in preparation 104 by controlled, grinding. For example, a uniform, particle size distribution may be achieved. In accordance with one aspect of the present disclosure, a particle size distribution of approximately 80% particle distribution passing size ($P_{80}$) of about 75 microns may be used, as well as a particle size distribution of approximately 98% particle distribution passing size ($P_{98}$) of about 100 to about 200 microns. In accordance with one aspect of the present disclosure, a particle size distribution of approximately 80% particle distribution passing size ($P_{80}$) of about 74 microns may be used.

However, in various embodiments, a uniform, ultra-fine particle size distribution is not necessary. For example, in various embodiments, a particle size distribution of approximately 80% particle distribution passing size ($P_{80}$) of about 100 microns may be used, and in various embodiments a particle size distribution of approximately 98% particle distribution passing size ($P_{98}$) of about 100 microns may be used. In various embodiments, preparation 104 does not include controlled grinding, but does include crushing and grinding to produce larger and/or less uniform particle sizes. For example, preparation 104 may comprise screening ore through a grizzly or other analogous device with about 250 mm openings. Further, preparation 104 may also include a mill operation. Particles having a size of less than about 250 mm can be received by mill operation which then reduces the received particles to a particle size distribution suitable for downstream processing. For example, the mill operation may provide particles having about 80% particle distribution passing size ($P_{80}$) of 100 microns. Other particle sizes described herein may also be useful. Preparation 104 yields a prepared ore that may be subject to oxidizing roast 106.

Oxidizing roast 106 comprises a roast performed under oxidizing conditions and may be performed using one or more oxidizing agents. For example, oxidizing roast 106 may be performed using oxidizing agent 122. Oxidizing agent may comprise air, oxygen gas ($O_2$), ozone ($O_3$), or a combination thereof. During oxidizing roast 106, oxidizing agent 122 may be injected or otherwise introduced into a roasting vessel. Oxidizing agent 122 may be introduced into oxidizing roast 106 until a suitable concentration of oxidizing agent 122 is achieved in the roasting vessel.

The temperature of the roasting vessel during oxidizing roast 106 may be adjusted to any suitable roasting temperature. For example, oxidizing roast 106 may be performed at from about 500° C. to about 750° C., more preferably from about 550° C. to about 700° C., and still more preferably at about 625° C. to about 675° C. In various embodiments, oxidizing roast 106 is performed at about 650° C. Oxidizing roast 106 produces oxidized metal bearing material.

Reducing roast 108 comprises a roast performed under reducing conditions and may be performed using one or more reducing agents. For example, reducing roast 108 may be performed using reducing agent 120. Reducing agent 120 may comprise carbon monoxide gas (CO), hydrogen gas ($H_2$), other suitable reagent, or combinations thereof. During reducing roast 108, carbon monoxide gas and/or hydrogen gas may be injected or otherwise introduced into a roasting vessel. The carbon monoxide gas or hydrogen gas may be introduced into reducing roast 108 until a suitable concentration of carbon monoxide gas or hydrogen gas is achieved in the roasting vessel. Carbon monoxide gas and/or hydrogen gas may be introduced into the roaster as preferably at least 90% carbon monoxide gas and/or hydrogen gas, preferably at least 95% carbon monoxide gas and/or hydrogen gas, and more preferably, about 100% carbon monoxide gas and/or hydrogen gas. The amount of reducing agent used is preferably at least the amount needed to reduce metal values that may be later recovered (e.g, copper and cobalt) to their elemental metallic form plus an excess portion to assure that the reduction reactions can reach substantial completion. During reducing roast 108, carbon monoxide gas, hydrogen gas, carbon containing solids, and mixtures thereof may be injected or otherwise introduced into a roasting vessel. The carbon monoxide gas or hydrogen gas may be introduced into reducing roast 108 until a suitable concentration of carbon monoxide gas or hydrogen gas is achieved in the roasting vessel.

In various embodiments, hydrogen gas is used as a reducing agent. The principal reaction product of the reducing reaction in the gas phase would be water. Thus, in such embodiments, water may be condensed from the exhaust gas into a liquid phase. The exhaust gas, which may contain hydrogen gas, may then be recycled into the roaster.

Carbon monoxide may be obtained from any suitable source. For example, carbon monoxide may be obtained from the burning of coke. Hydrogen gas may be obtained from any suitable source. For example, hydrogen gas may be produced by fossil fuel reforming. Fossil fuel reforming may comprise reacting steam and a fuel source to produce hydrogen. For example, diesel fuel, natural gas (methane), propane, and gasoline may be used as a fuel for fossil fuel reforming. In addition, fossil fuel reforming may not require a "fossil" fuel per se but a fuel that may be similar to a fossil fuel. For example, in certain circumstances, oils of plants or animals and/or ethanol may be used in addition to or in place of fossil fuels.

The temperature of the roasting vessel during reducing roast 108 may be adjusted to any suitable roasting temperature. For example, reducing roast 108 may be performed at about 400° C. to 625° C., more preferably about 475° C. to about 575° C., and still more preferably at about 500° C. to about 550° C. In various embodiments, reducing roast 108 is performed at about 540° C. Reducing roast 108 produces reduced metal bearing material.

The temperature of the roasting vessel during reducing roast 108 may be adjusted to any suitable roasting temperature. For example, reducing roast 108 may be performed at about 400° C. to 625° C., more preferably about 475° C. to about 575° C., and still more preferably at about 500° C. to about 550° C. In various embodiments, reducing roast 108 is performed at about 540° C.

Reducing roast 108 and oxidizing roast 106 may take place in two stage roaster. A two stage roaster may comprise one chamber configured to perform reducing roast 108 and an additional chamber configured to perform oxidizing roast 106. In various embodiments, reducing roast 108 and oxidizing roast 106 may take place in separate roasters.

After roasting (whether oxidative, reductive, or both), metal bearing material may be quenched or otherwise treated prior to subsequent processing. Quenching, for example, may be used to reduce the temperature of roasted metal bearing material after a roast is completed. Quenching provides a transition from the elevated temperatures of roasting to a temperature closer or equal to that of ambient temperature. In the case in which the ore has been reduced in the roasting step, quenching may also serve to limit the re-oxidation of the reduced material. Quench media may be water or a basic solution which may contain free ammonia and an ammonia compound.

After reducing roast 108, reduced metal bearing material may be subject to ammonia/ammonium leach 110. In accordance with various aspects, ammonia/ammonium leach 110 comprises an agitated tank leach. Ammonia/ammonium leach 110 may comprise an agitated tank leach that is performed at constant or varying basic pH levels. Basic pH levels may range from about 7 to about 14. Ammonia/ammonium leach 110 is performed using basic media containing ammonia or ammonium compounds. For example, the basic media used in ammonia/ammonium leach 110 basic media may include an aqueous solution of ammonia, ammonium and/or ammonium containing compounds such as ammonium carbonate, ammonium sulfate and combinations thereof. One or more metal values from the reduced metal bearing material may be absorbed into the basic media. Basic media that contains metal values may be referred to as a pregnant leach solution. Leach solutions may contain recycled solutions from upstream processes and recovered lixiviant from various processing steps. Fresh lixiviant may also be added. Leaching may occur in several tanks, either co-currently or counter-currently depending on the leach characteristics and kinetics. Preferably, the duration of leaching in accordance with various aspects of the present invention ranges from about 2 hours to about 8 hours. More preferably, the duration ranges from about 4 hours to about 7 hours.

The pregnant leach solution may be present with solids in ammonia/ammonium leach 110. Together, the pregnant leach solution and solids of ammonia/ammonium leach 110 may be referred to as a slurry.

The slurry from ammonia/ammonium leach 110 is subject to solid liquid phase separation 112. Solid liquid phase separation 112 may comprise any of the solid liquid phase separation techniques described herein or hereinafter developed. Liquids from solid liquid phase separation 112 may be forwarded to SX 114.

SX 114 may comprise any solution extraction process. In various embodiments, SX 114 comprises a liquid-liquid extraction. During SX 114, metal values from the liquids from solid liquid phase may be loaded selectively into an organic phase in an extraction phase, wherein the organic phase comprises an extracting agent to aid in transporting the metal values to the organic phase. The extraction phase may produce an aqueous raffinate. The organic phase from the extraction stage may be then subjected to a solvent stripping phase, wherein the metal values are transferred to an aqueous phase. For example, more acidic conditions may shift the equilibrium conditions to cause the metal values to migrate to the aqueous phase. Metal value containing liquid from SX 114 may be referred to as a loaded aqueous stream.

The loaded aqueous stream from SX 114 may be subject to further processing, such as electrowinning, to yield a metal value.

In electrowinning, in accordance with various embodiments, the anode is configured to enable the electrolyte to flow through it. As used herein, the term "flow-through anode" refers to an anode so configured.

Any now known or hereafter devised flow-through anode may be utilized in accordance with various aspects of the present invention. Possible configurations include, but are not limited to, metal wool or fabric, an expanded porous metal structure, metal mesh, multiple metal strips, multiple metal wires or rods, perforated metal sheets, and the like, or combinations thereof. Moreover, suitable anode configurations are not limited to planar configurations, but may include any suitable multiplanar geometric configuration.

While, in various embodiments, anodes may be lead-containing (e.g., Pb—Sn—Ca), preferably, the anode is formed of one of the so-called "valve" metals, including titanium (Ti), tantalum (Ta), zirconium (Zr), or niobium (Nb). The anode may also be formed of other metals, such as nickel, or a metal alloy, intermetallic mixture, or a ceramic or cermet containing one or more valve metals. For example, titanium may be alloyed with nickel (Ni), cobalt (Co), iron (Fe), manganese (Mn), or copper (Cu) to form a suitable anode. Preferably, the anode comprises titanium, because, among other things, titanium is rugged and corrosion-resistant. Titanium anodes, for example, when used in accordance with various aspects of embodiments of the present invention, potentially have useful lives of up to fifteen years or more. Titanium anodes may comprise titanium-clad anodes. Titanium-clad anodes comprise a metal, such as copper, clad in titanium, The anode may also comprise any electrochemically active coating. Exemplary coatings include those that comprise platinum, ruthenium, tantalum, iridium, other Group VIII metals, oxides of the same, and mixtures of the same. Ruthenium oxide, tantalum oxide, and iridium oxide are preferred for use as the electrochemically active coating on titanium anodes when such anodes are employed in connection with various embodiments. In accordance with one embodiment of the invention, the anode is formed of a titanium metal mesh coated with an iridium oxide and/or tantalum oxide-based coating. In such embodiments, the iridium oxide and/or tantalum oxide-based coating may be comprised of multiple layers of iridium oxide and/or tantalum oxide. The multiple layers may comprise iridium oxide and/or tantalum oxide in an amorphous state or a crystalline state. In another embodiment of the invention, the anode is formed of a titanium mesh coated with a rutheium-based oxide coating. Anodes suitable for use in accordance with various embodiments of the invention are available from a variety of suppliers.

In various embodiments, copper electrowinning operations use either a copper starter sheet or a stainless steel or titanium "blank" as the cathode. In accordance with one aspect of an exemplary embodiment, the cathode is configured as a metal sheet. The cathode may be formed of copper, copper alloy, stainless steel, titanium, or another metal or combination of metals and/or other materials. The cathode is typically suspended from the top of the electrochemical cell such that a portion of the cathode is immersed in the electrolyte within the cell and a portion (generally a relatively small portion, less than about twenty percent (20%) of the total surface area of the cathode) remains outside the electrolyte bath. The total surface area of the portion of the cathode that is immersed in the electrolyte during operation of the electrochemical cell is referred to herein, and generally in the literature, as the "active" surface area of the cathode. This is the portion of the cathode onto which copper is plated during electrowinning.

In accordance with various embodiments of the present invention, the cathode may be configured in any manner now known or hereafter devised by the skilled artisan.

In accordance with various embodiments, the copper concentration in the electrolyte for electrowinning is advantageously maintained at a level of from about 20 to about 60 grams of copper per liter of electrolyte. Preferably, the copper concentration is maintained at a level of from about 30 to about 50 g/L, and more preferably, from about 40 to about 45 g/L. However, various aspects of the present invention may be beneficially applied to processes employing copper concentrations above and/or below these levels.

Figure 2:
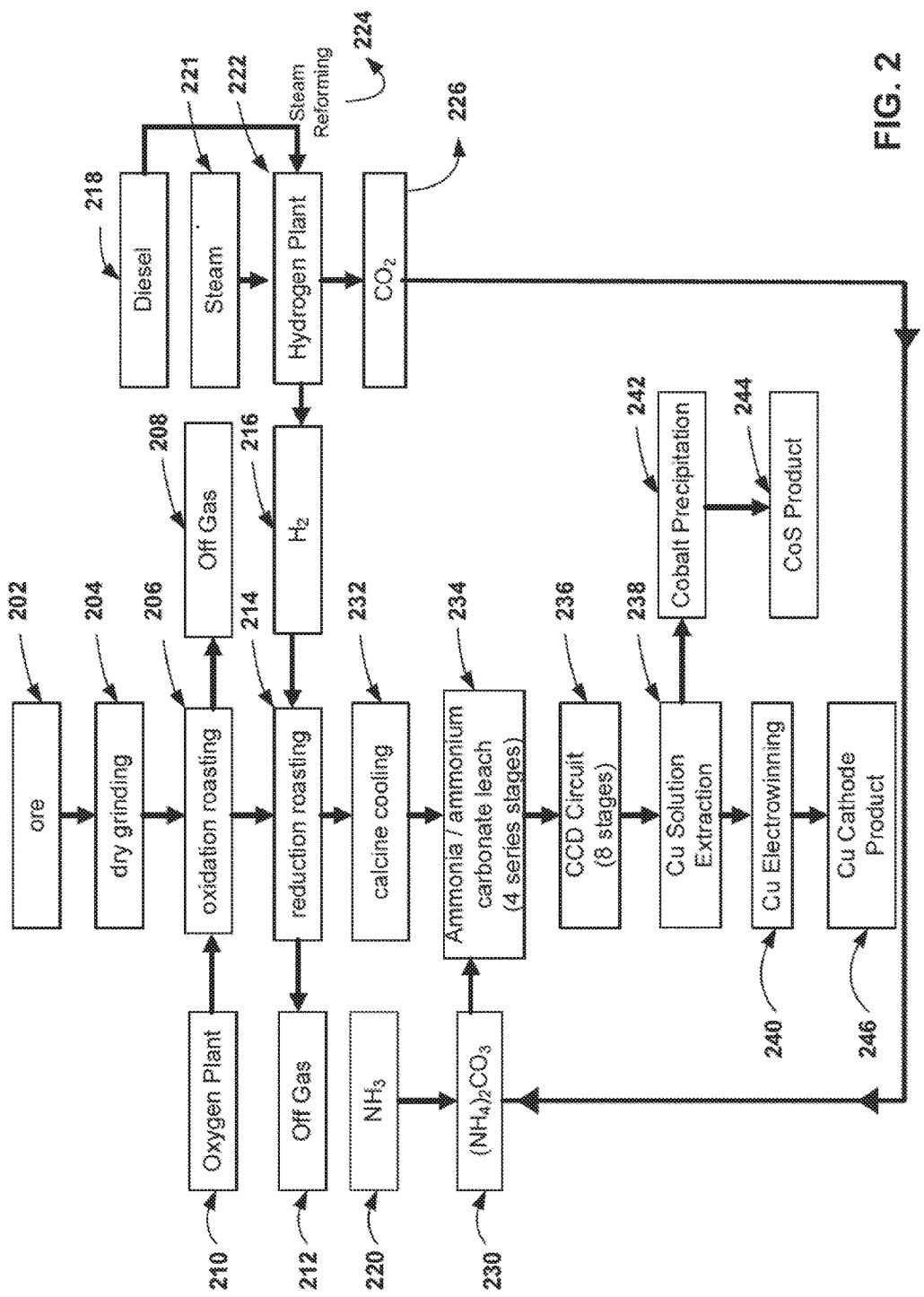
FIG. 2 is a flow diagram illustrating a further process that does not include an acid leach, in accordance with various embodiments of the present invention.

With reference to FIG. 2, copper recovery process 200 is illustrated. Ore 202 may comprise any copper bearing ore. Ore 202 may be subject to dry grinding 204, in accordance with any of the grinding processes described herein. For example, dry grinding 204 may comprise grinding the ore to a P80 of 60 to 100 microns, preferably about 75 microns. Dry grinding 204 yields ground ore, which may be subject to oxidation roasting 206.

Oxidation roasting 206 may comprise any of the oxidative roasts described herein. For example, oxidation roasting 206 may comprise heating ground ore at about 625° C. to about 675° C. under an oxidizing agent. Oxidation roasting may take place in a fluidized bed roaster. The oxidation process may take between about 10 and about 30 minutes, preferably about 20 minutes. Oxygen ($O_2$) gas may be used an oxidizing agent. Oxygen gas is produced at oxygen plant 210 using any known technique. For example, oxygen may be distilled from ambient air. Off gas 208 is configured to release gas from oxidation roasting 206. Oxidation roasting 206 may yield oxidized ore, which may be subject to reduction roasting 214.

Reduction roasting 214 may comprise any of the reductive roasts described herein. For example, reduction roasting 214 may comprise heating ground ore at about 500° C. to about 550° C. under a reducing agent. Reducing gasses are introduced into a fluidized bed roaster. Retention time in the roaster may be from about 10 to about 30 minutes, preferably about 20 minutes. Hydrogen ($H_2$) gas 216 may be used a reducing agent. Hydrogen gas may be produced by hydrogen plant 222. Hydrogen plant 222 may use diesel fuel or another suitable hydrocarbon 218 and steam 221 in a steam reforming process 224 to produce hydrogen gas 216. Reduction roasting 214 yields reduced ore. Reduced ore maybe subject to calcine cooling 232 to cool the reduced ore. The reduced ore may then be subject to ammonia/ammonium carbonate leach 234.

Hydrogen plant 222 exhausts carbon dioxide 226. Carbon dioxide 226 may be advantageously recycled and combined with ammonia to form ammonium carbonate 230.

Ammonia/ammonium carbonate leach 234 may comprise a leaching process using basic media comprising ammonia and/or ammonium carbonate. Ammonia 220 may be combined with ammonium carbonate 230 for use in the basic media of ammonia/ammonium carbonate leach 234. Copper and cobalt contained in the reduced ore may be leached into the basic media of ammonia/ammonium carbonate leach 234. The leach may comprise one or more stages arranged in either a co-current or a countercurrent process arrangement. Ammonia/ammonium carbonate leach 234 may output a pregnant slurry that is forwarded to CCD circuit 236. CCD circuit 236 is a counter current decantation circuit. CCD circuit 236 has 8 stages, though any suitable number of stages is contemplated herein. CCD circuit 236 performs a solid liquid phase separation on the pregnant slurry. The liquid phase from CCD circuit 236 may be referred to as pregnant leach solution.

Pregnant leach solution from CCD circuit 236 may be subject to copper solution extraction 238. Copper solution extraction 238 may comprise any solution extraction process. In various embodiments, copper solution extraction 238 comprises a liquid-liquid extraction. During copper solution extraction 238, copper (e.g., ionic copper) from the liquids from solid liquid phase may be loaded selectively into an organic phase in an extraction stage, wherein the organic phase comprises an extracting agent (e.g. a ketoxime, a modified ketoxime or an aldoxime/ketoxime blend) to aid in transporting the copper to the organic phase. The raffinate from the extraction stage may contain secondary metal values (e.g., cobalt). The raffinate may be subject to cobalt precipitation 242 to precipitate the cobalt from the raffinate. Cobalt may be recovered as cobalt sulfide or another relatively water insoluable form in CoS Product 244. The cobalt in the solid phase may be recovered using, for example, another leaching process.

The organic phase from the extraction stage of copper solution extraction 238 may be then subjected to one or more wash stages in which the loaded organic phase is contacted with an aqueous phase in order to remove entrained ammonia bearing droplets from the organic phase. The washed organic phase may then be subject to a solvent stripping stage, wherein the copper is transferred to an aqueous phase. For example, more acidic conditions may shift the equilibrium conditions to cause the copper to migrate to the aqueous phase. Copper containing liquid from copper solution extraction 238 may be referred to as a loaded aqueous stream.

The loaded aqueous stream may be subject to copper electrowinning 240. Copper electrowinning 240 may comprise any process by which copper cathode product 246 is electrowon from the loaded aqueous stream. In various embodiments, copper electrowinning 240 may comprise producing copper powder using a flow through cathode. Copper electrowinning 240 may take place in one or more electrochemical cells. An electrochemical cell generally comprises a cell, at least one anode, at least one cathode, and, in various embodiments, an electrolyte flow manifold.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A process comprising:
   roasting a metal bearing material comprising a copper carbonate under oxidizing conditions, at a temperature between about 625° C. and about 675° C.;
   roasting the metal bearing material under reducing conditions, at a temperature of about 500° C. or greater; and
   leaching the metal bearing material in a basic medium to yield a pregnant leach solution.

2. The process of claim 1, wherein the basic medium comprises at least one of ammonia, ammonium carbonate and ammonium sulfate.

3. The process of claim 1, wherein the oxidizing conditions comprise an oxygen gas containing atmosphere.

4. The process of claim 1, wherein the reducing conditions comprise a hydrogen gas containing atmosphere.

5. The process of claim 1, further comprising subjecting the pregnant leach solution to a solution extraction process to yield a loaded aqueous stream.

6. The process of claim 5, wherein an extraction stage of the solution extraction yields a cobalt-bearing raffinate.

7. The process of claim 6, further comprising precipitating cobalt from the cobalt-bearing raffinate.

8. The process of claim 7, wherein the precipitating yields cobalt sulfide.

9. The process of claim 8, wherein the cobalt sulfide is subjected to leaching.

10. The process of claim 5, subjecting the loaded aqueous stream to electrowinning.

11. The process of claim 1, wherein the copper carbonate comprises at least one of azurite and malachite.

12. A process comprising:
    oxidizing a metal bearing material comprising a copper carbonate to produce an oxidized metal bearing material at a temperature between about 625° C. and about 675° C.;
    reducing the oxidized metal bearing material at a temperature of about 540° C. to produce a roasted metal bearing material; and
    leaching the roasted metal bearing material in a basic medium to yield a pregnant leach solution.

13. The process of claim 12, wherein the basic medium comprises at least one of ammonia, ammonium, ammonium carbonate and ammonium sulfate.

14. The process of claim 12, wherein the oxidizing is performed using an oxidizing agent, and wherein the reducing is performed using a reducing agent.

15. The process of claim 12, further comprising at least one of preparing the metal bearing material and quenching the roasted metal bearing material.

16. The process of claim 12, further comprising subjecting the pregnant leach solution to a solution extraction process to yield at least one of a loaded aqueous stream and a cobalt-bearing raffinate.

17. The process of claim 16, further comprising precipitating cobalt from the cobalt-bearing raffinate.

18. The process of claim 17, wherein the precipitating yields cobalt sulfide.

19. The process of claim 18, subjecting the loaded aqueous stream to electrowinning.

* * * * *